UNITED STATES PATENT OFFICE.

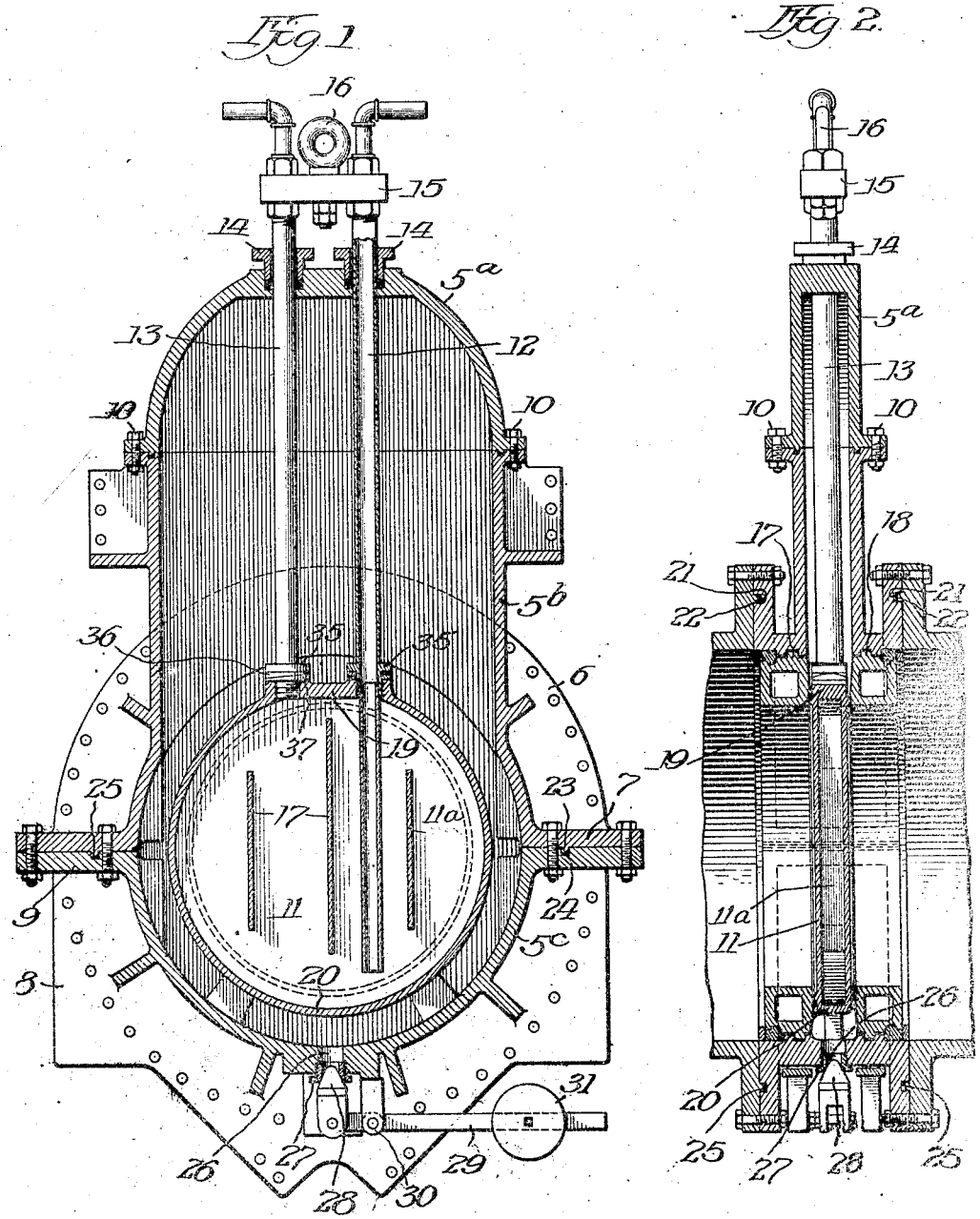

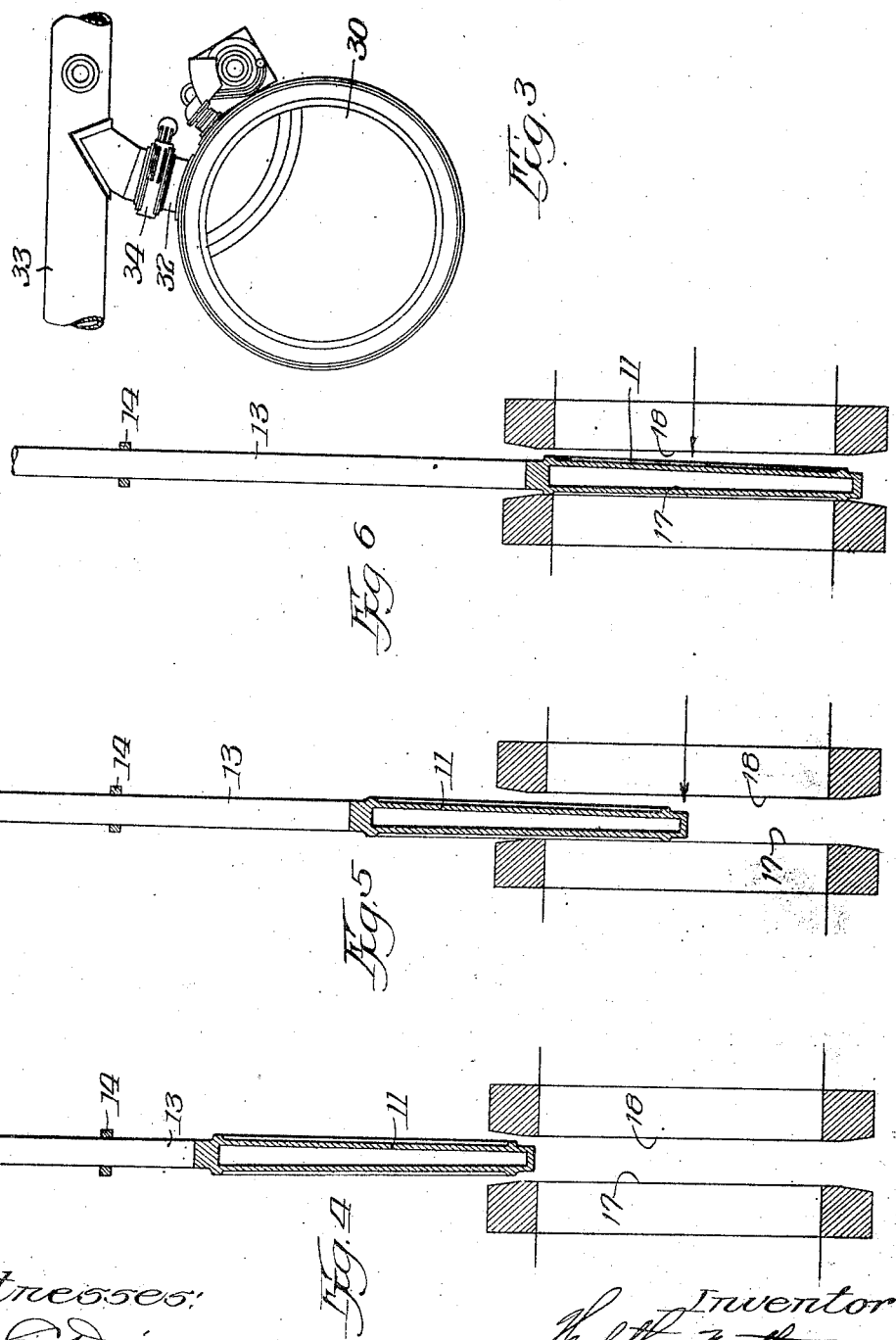

ALTHER MATHESIUS, OF CHICAGO, ILLINOIS.

HOT-BLAST VALVE.

1,228,463.　　　　Specification of Letters Patent.　　Patented June 5, 1917.

Application filed September 9, 1916. Serial No. 119,273.

*To all whom it may concern:*

Be it known that I, WALTHER MATHESIUS, a citizen of the United States, and resident of Chicago, in the county of Cook and State of Illinois, have invented certain new and useful Improvements in Hot-Blast Valves of the Gate Type, particularly those of larger dimensions, such as are used in gas and air conduits, and especially the water-cooled variety used in connection with hot-blast mains at metallurgical furnaces.

In connection with hot blast stoves at blast furnaces, valves of this type have been used in various countries. In most cases their use was discontinued, due to inability to overcome certain deficiencies in construction as well as in operation, which outweighed the acknowledged superiority in principle of this type of valve over other designs, especially over the mushroom style valve which is commonly used at hot blast stoves of blast furnaces.

I have by my invention overcome the above mentioned deficiencies of the gate valve and have developed a new and superior type of valve, which forms the subject matter of my invention. The following is a detailed description of the same.

Heretofore valves of this type have been inserted in the gas or air conduits by means of flanged joints, the valve being held between straight flanges by screw-bolts or other suitable means of fastening. Where hot gases had to be conveyed through valves installed in this manner, as for instance, at hot blast stoves of blast furnaces, it was soon found to be impossible to maintain the respective joints without prohibitive air leakage. This was due to the fact that the valve body as well as the hot blast main and connecting bolts, being heated and cooled in alternating periods, would expand and contract periodically, resulting in a loosening of the flanged joints. Such leaks, although small at first, would gradually grow worse on account of the cutting effect of the hot blast, and soon become prohibitive, necessitating the replacing of the valve and extensive repairs to the flange surfaces.

I overcome this difficulty by designing such gate valves so as to allow the flange faces to be protected by a tongue and groove joint, in which an elastic packing is inserted. This I accomplish by making the distance between the flanges of the hot blast conduit somewhat greater than the width of the valve body to be installed between these flanges, and by supporting or suspending the hot blast main in such a way as to allow of a certain movement. This permits of first putting the valve in place and inserting the ridge on the male part of the flanged joint into the groove of the other part containing the elastic packing. By then tightening up the screw bolts, or other means of fastening, the joints are pulled together and a perfectly tight seal is effected, which may be subjected to the above mentioned alternate heating and cooling without becoming loose and leaky.

The idea of inserting an elastic packing in a grooved joint, in order to permanently prevent leakage, has also been applied to other parts of the gate valve and in this connection forms a part of my invention. Particularly I refer here to the method employed in inserting the valve seats into the valve body which combines with simplicity the certainty of a perfect alinement of the seats, and permanently prevents any leakage around the outer circumference of the latter.

Another important improvement which I claim as a part of my invention is the development of a new method for obtaining a perfect and lasting seal between the valve and the seats. The importance of this feature, particularly for the conveyance of hot gases under pressure will be readily understood considering the above mentioned cutting effect of the gases, which of course, is particularly severe on comparatively soft metal, such as the bronze used in the manufacture of these valves and seats.

Heretofore two different methods have been employed for the alinement of such valves. One of these consists of installing a valve of uniform width and with seating surfaces paralleling each other, between two parallel seats having an exactly uniform distance between them. The width of the valve is slightly less than the distance between the seats, to insure ease of operation, and the air or gas pressure against the valve in its closed position is depended upon for holding the valve against the seat and overcoming the resistance of the valve stem, which must be bent in order to allow the valve to properly seat itself. The deficiency of this method lies obviously in its dependence for tightness upon the pressure of the conveyed medium, and it is evident that if this pressure is lowered to a certain degree, leakage must occur.

The other method consists of inserting a tapered valve between seats, the distance of which varies in proportion to the valve taper. In its closed position the valve is thus wedged between the seats, and it becomes loose and swings free when opened. This method entails a serious operating difficulty which lies in the danger of the valve getting wedged too tightly between the seats, preventing its quick and easy operation.

I overcome the deficiencies of both of these methods by installing a tapered valve between two annular seats, the distance between the seats being only slightly larger than the thickness of the valve at the stem end. By virtue of the valve taper the clearance between the valve and seats becomes greater toward the opposite end of the valve; this allows of a certain lateral movement of the valve hanging on the stem or stems and swinging in an arc of which the packing gland of such stem or stems is the center. The mean distance between the valve and the seats, as well as the taper of the valve, is calculated with reference to the radius of the movement, so as to bring one of the valve faces into complete contact with its seat as soon as the valve engages the seat, and this contact is made uniformly and simultaneously over the entire valve seat. It is evident that with this arrangement absolute ease of operation is insured and a perfect seal between the valve and either one of the seats is effected, a very slight differential pressure being sufficient to accomplish the necessary movement of the valve against the seat. This pressure is far less than in the case of valves with parallel faces, as my valve swings freely from the center of movement, and no distortion of the stem occurs; in fact, no strain is exerted whatsoever, in bringing the valve to its seat.

As can readily be seen, it is essential with an arrangement of this kind to have the valve stem or stems in perfect alinement with the center plane of the valve. Present methods of fastening the stems into such valves, for instance, by means of a pipe thread, or perhaps with the aid of a lock-nut, are deficient in this respect. Where a single stem is used they entail another difficulty inasmuch as they offer little insurance against accidental loosening of the threaded joint. I have overcome both these difficulties by equipping the end of the stem with a straight flange immediately above the screw thread, and by providing a straight seating surface for said flange on the valve. Intentionally the thread is cut rather loosely, so as to allow of a certain lateral movement of the stem before being screwed tight. In assembling, two tapered gaskets may be inserted between the flange of the valve stem and the seating face for the same on the valve. By turning one of these gaskets against the other any desired adjustment within the play allowed by the screw thread can easily be accomplished. Insurance against accidental loosening of the valve stems, in case two separate stems are employed, may be provided by locking the stems together through a yoke at the opposite end of said stems.

Where these valves are employed in pipe lines conveying gases which contain a considerable amount of solid matter, it becomes necessary to, from time to time, remove accumulations of such matter from the lowest point of the space between the valve seats, in order to safeguard against operating difficulties. This is done by opening a cleaning hole provided at this point; if the pressure within is sufficient the dirt accumulation is quickly blown out. It is evident that this method of cleaning exposes the outer edge of the cleaning opening and the means for closing the same (either an ordinary gate valve or a cone-shaped plug held in place by a lever with counterweight) to the full force of the cutting effect of this blast, which in time will invariably lead to leakage and necessitate the replacing of the valve, or a tedious re-facing of the seating surfaces, as the case might be. In my invention I overcome these difficulties by providing a bushing for this cleaning hole, preferably of bronze, held in place by means of a thread or otherwise; a cone-shaped plug is seated against this bushing, insuring a perfect fit and allowing of quick and inexpensive replacement of all parts exposed to extraordinary wear.

To enable those skilled in the art to more clearly understand my invention, attention is directed to the drawings, wherein—

Figure 1 is a vertical sectional view through a gate valve constructed in accordance with my invention;

Fig. 2 is a transverse vertical sectional view taken at right angles to that of Fig. 1;

Fig. 3 is a plan view of a hot blast stove, gas main and bustle pipe connecting the stove with the gas main and showing a valve of my invention inserted in the elbow;

Figs. 4, 5 and 6 are diagrammatic views showing different positions of the valve with relation to its seat, the dimensions being considerably exaggerated.

The valve casing comprises a top portion $5^a$, an intermediate portion $5^b$ and a lower portion $5^c$. The intermediate portion $5^b$ is provided with vertical and horizontal flanges 6 and 7, and the lower portion $5^c$ is provided with vertical and horizontal flanges 8 and 9. The horizontal flanges 7 and 9 are adapted to be joined for the purpose of fastening the lower to the intermediate portion of the casing. Top member 5ª of the casing is attached to the intermediate member 5ᵇ in any well known manner. I have shown it as fastened with a tongue and groove construction at all points. The hollow disk valve 11 is circular in contour and tapered in vertical transverse section as is best shown in Fig. 4. As a valve stem I prefer to use two pipes, 12 and 13, extending through the top of the casing 5ª and guided in the glands 14. By employing pipes as valve stems I provide for the inlet and discharge of cooling water for the valve. I prefer to extend pipe 12 almost to the bottom of the interior of valve 11, while pipe 14 is connected to valve 11 at its upper portion. Exteriorly of the casing 5, I prefer to employ a yoke 15 connecting the pipes 12 and 13 to prevent their twisting. To this yoke I fasten an eye bolt 16, to which the raising and lowering means may be fastened. The ends of pipes 12 and 13 may be connected to any available source of water supply. Within the interior of the valve 11 I prefer to use a series of vertically extending baffles 11ª, for the purpose of enforcing circulation and stiffening of the valve.

For valve seat members I prefer to employ a pair of annular members 17 and 18, best seen in Fig. 2, vertically positioned within the casing members. The distance between the faces of the seat members 17 and 18 is the same at all points. The thickness of the valve 11 at the stem portion 19 is slightly less than the distance between the faces of the seat members 17 and 18, while the lower end 20 is thinner than the stem portion 19, the reasons for which will be more fully explained later on. The valve 11 is suspended by the pipes 12 and 13 as a stem, so that it may swing from the gland 14. Because of the fact that the thickness of the valve 11 is less than the distances between the seat members 17 and 18, a slight swinging of the valve is permitted. When there is no gas passing through the mains, the valve 11 will hang in a perpendicular position out of engagement with either seat member 17 or 18. Valves of this type used in a hot gas main rely for their closing on the pressure of the gas against the valve. The taper of the sides of the valve 11 is such that when the valve 11 is swung against either member 17 or 18, a erfect and complete seal between the valve and seat against which it is forced will be made. It is understood that the taper of the valve will have to vary with the distance from the gland 14 to the connection between the valve 11 and the stems 12, 13. This is illustrated diagrammatically in Figs. 4 to 6 inclusive.

By providing a straight seat and a downwardly tapered valve it will be seen that by establishing a definite ratio between the amount of taper and the arc of rotation the valve will have a theoretical line contact only at all points except the fully closed position and that in that position the contact will be complete. The extent of taper of the valve must correspond to the increase in extent of rotation of the valve due to its greater distance from the center of rotation—in this instance the gland 14. In Fig. 4 the valve is shown in raised position, and it would at first sight seem impossible that a tapered valve could coöperate with a straight seat. Fig. 5 shows an intermediate position and even with the exaggerated dimensions does not correctly illustrate the exact condition, due to the inability to make the lines sufficiently fine. Sufficient to say, however, the surfaces of valve and seat have only a line contact. In Fig. 6 the valve is shown fully seated by the pressure of gas behind it, the valve having swung sufficiently to bring its face into a vertical position coincidentally with its contact with the seat.

It is of course essential that the valve be carefully adjusted with relation to its stem and seat and this cannot be done by any of the means heretofore proposed. I prefer to provide each of the stems with a straight flange 35, immediately above the screw-threaded end thereof. Intentionally the thread is cut rather loosely in the connection between the stems and the valve, so as to allow of a certain lateral movement of the stems. In assembling the parts two tapered gaskets 36, 37, may be inserted between the flange 35 and the valve. By turning the gaskets or washers relatively any desired adjustment may be secured within the play allowed by the loose thread.

To overcome the distorting of the flanges of the valve casing and also of the mains due to the decided differences in temperature between the main and valve, I provide in the faces of the flanges of the valve casing, recesses 21 and in the flanges in the gas mains similarly positioned and shaped projections 22.

In horizontal flanges 7 and 9 of the casing I have provided similar grooves 23 and tongues 24. I have discovered that if I insert an elastic packing medium it is possible by the contact therewith of the tongue to secure a leak-tight joint and also to prevent distortion of the flanges forming the joint to such an extent that breakage does not occur. This medium is represented by the numeral 25.

It must be kept in mind that the mains used in such an apparatus are of great size, those in general use being about six feet in diameter, so that the loss due to distortion of the flanges of a gate valve of size necessary to be used in such a sized pipe is of great importance and any improvement that will permit the use of a gate valve in a pipe line of six feet or more in diameter is of value. I have found by experience that a gate valve made in accordance with my invention connected into a gas main having the elastic material between the several flange joints gives excellent service and does not have to be replaced because of faulty flange connections.

The gases which are conveyed through mains of this sort carry considerable amount of solid matter. In the course of time this matter becomes deposited in the lower part of the valve casing, usually between the seat members 17 and 18, so that it is necessary to provide means to rid the casing of this solid matter. To accomplish this I provide an opening in the lower part of the casing between the seat members 17 and 18, and at the outer end of this opening 26 insert a bushing 27. This bushing may be of bronze or any material suitable for such purpose. It has been found that when solid matter is blown from the valve casing that there is considerable wear on the blow hole. By use of the bushing 27, I overcome the wearing effects of the solid matter on the blow hole 26, thereby prolonging the life of the casing. Whenever a bushing 27 is worn out it may be replaced with another. In the opening in hole 26 I employ a cone-shaped plug 28, secured to the end of arm 29, which is pivoted to the casing member by the connection 30. At the outer end of the arm 29 there is a counterweight 31 slidably mounted on the arm. This counterweight serves to hold the stopper 28 against bushing 27, thereby closing the hole 26. When it is desired to empty the solid matter that has accumulated within the casing the stopper 28 is drawn away from the hole and the pressure of the gas within the casing is sufficient to blow out whatever solid matter may have become deposited therein.

Referring now to Fig. 3: Numeral 30 indicates a hot blast stove, connected through pipe 32 with main 33. Installed in the pipe 32 is the valve embodying my invention, which is designated by the numeral 34. The pipe 33 is mounted by means (not shown) so as to permit a slight swinging or lateral movement to enable the insertion or removal of the valve 34 when it is so desired.

It is understood that the preferred form by which I have chosen to show my invention is not the only form of the invention. It is obvious that to accommodate the valve embodying my invention to pipes of different sizes and shapes it may be necessary to vary to some extent, and consequently the taper of the valve proper. It will be understood that while I have described the valve as tapered and the seats as parallel, such construction might be reversed without departure from the spirit of my invention.

I claim:

1. In a gate valve, the combination with a valve casing, of a pair of vertically positioned parallel annular seat members in spaced relation, a disk valve for engagement between said seat members, said valve being of wedge shape in vertical transverse section and a stem supporting said valve, said valve being mounted for swinging movement from its point of support to alternately engage said seats when in fully closed position, substantially as described.

2. In a gate valve, the combination of a pair of annular parallel valve seats, a valve for coöperation therewith, a stem supporting the valve through the casing whereby the valve is permitted to swing between the seat members with the point of support as a center, the valve being tapered so as to engage every portion of either seat member when swung thereagainst, substantially as described.

3. In a gate valve for hot blast mains, the combination with a valve casing a pair of vertically mounted parallel annular seat members, the seat members being in spaced relation, a valve proper, a valve stem attached to said valve, and extending through said valve casing, said valve stem being supported as a pendulum at the point where the valve stem passes through the valve casing, said valve being tapered in vertical transverse section, the taper being such as to permit one side of the valve when swung against one of the seat members to be in contact therewith, substantially as described.

4. In a gate valve, a casing having a valve seat arranged perpendicular to the longitudinal axis of the pipe within which the valve is located, a valve having a coöperating face arranged out of parallelism with the operating stem, said valve being mounted for limited swinging movement from the point of entrance of the stem to the casing, the valve face being so shaped as to be in parallelism with said seat only when fully closed, substantially as described.

5. In a gate valve, a casing, a valve mounted in said casing and adapted for limited swinging movement from the point of entrance of the valve stem to the casing, said casing being provided with parallel seats, a valve, the faces on opposite sides of which converge toward the end of the valve, the relation between the taper of the valve and the extent of swinging movement therebeing such that either face of the valve is parallel with its coöperating seat when the valve is in closed position and in contact with the seat, substantially as described.

6. In a valve, a casing, a valve having a stem and adapted for swinging movement in the casing, the coöperating faces of the casing and seat being out of parallelism in open positions of the valve, and means in the connection between the valve and stem for adjusting the position of the valve, substantially as described.

7. In a gate valve, a casing, a valve, a stem loosely threaded into said valve, and a tapered washer in the connection between the stem and valve and serving to adjust the position of the valve relative to the stem, substantially as described.

Signed at Chicago, Illinois, this 17th day of August, 1916.

WALTHER MATHESIUS.

Witnesses:
 D. V. MEDALIE,
 GUS LERMAN.